United States Patent Office 3,770,850
Patented Nov. 6, 1973

3,770,850
BIS(POLYPHENYLENE OXIDE)-URETHANE
BLOCK COPOLYMERS
Dwain M. White, Schenectady, N.Y., assignor to
General Electric Company
No Drawing. Original application Jan. 5, 1970, Ser. No.
817, now Patent No. 3,703,564. Divided and this application Feb. 2, 1972, Ser. No. 222,988
Int. Cl. C08g 41/04
U.S. Cl. 260—858                                   8 Claims

ABSTRACT OF THE DISCLOSURE

The invention relates to block copolymers of the A–B–A type where each A is the phenoxy residue of a poly(2,6 - disubstituted-1,4-phenylene oxide) having one terminal hydroxyl per polymer molecule and B is the residue of a compound having two groups which are reactive with the hydroxyl group of said poly(phenylene oxide). These compositions are useful in producing molded articles, films, fibers, etc., having modified properties compared to the parent poly(phenylene oxides).

This is a division of application Ser. No. 817, filed Jan. 5, 1970, now Pat. No. 3,703,564.

This invention relates to block copolymers of the A–B–A type where each A is the phenoxy residue of a poly(2,6 - disubstituted-1,4-phenylene oxide) having one terminal hydroxyl group per polymer molecule and B is the residue of a compound having two groups which are reactive with the hydroxyl group of the poly(phenylene oxide). More specifically, the substituents of the poly(phenylene oxide) are methyl or phenyl, i.e., the poly(phenylene oxides) are poly(2,6-dimethyl-1,4-phenylene oxide), poly(2 - methyl - 6-phenyl-1,4-phenylene oxide), poly(2,6-diphenyl-1,4-phenylene oxide) and copolymers wherein the repeating units are mixtures of said poly(phenylene oxides). The compounds having two groups reactive with the hydroxyl group of the poly(phenylene oxides) can be either simple organic compounds or they can be the polymeric reaction products of these compounds with simple dihydroxy compounds which are so reacted that the two terminal groups of the polymer are the groups which are reactive with the hydroxyl group of the poly(phenylene oxide). It is thus seen that each B unit is bifunctional and couples two monofunctional A units together to form a block copolymer which can be considered a polymeric end-capped poly(phenylene oxide).

Poly(phenylene oxides), sometimes known as polyphenylene oxides or polyphenylene ethers, as a general class, are an extremely interesting group of new polymers. These polymers, both homopolymers and copolymers, and processes of producing them are disclosed in U.S. Pats. 3,306,874, 3,306,875 and 3,432,466, all in the name of Allan S. Hay and assigned to the same assignee as the present invention. These patents are hereby incorporated by reference. These poly(phenylene oxides) have many desirable properties and have found wide commercial acceptance. Generally, these poly(phenylene oxides) are poly(2,6-disubstituted-1,4-phenylene oxides) which are made by oxidative coupling of 2,6-disubstituted phenols. The most readily available phenols are 2,6-dimethylphenol, 2-methyl-6-phenylphenol and 2,6-diphenylphenol. Therefore, the most readily available polymers are the corresponding poly(phenylene oxides) corresponding to these phenols.

In general, the poly(phenylene oxides) should have an average degree of polymerization sufficiently high that the number average molecular weight of the polymer is at least 10,000. For a given average degree of polymerization, the number average molecular weight will of course vary depending on the molecular weight of the particular phenoxy repeating unit making up the polyphenylene oxide. Since the physical properties are more dependent on the average degree of polymerization than the particular value of the molecular weight, the average degree of polymerization should be no less than 75 and preferably at least 100. However, the polymer's physical properties improve as the degree of polymerization increases above these values.

In the oxidative coupling reaction of phenols to produce poly(phenylene oxides), a phenolic hydroxyl group is present on one end of each polymer molecule up to the point where the polymers have an average degree of polymerization of about 75–85. As the coupling reaction is continued, to produce higher molecular weight polymer, a secondary reaction, the mechanism which is yet unknown, causes some of these terminal hydroxyl groups to disappear. This reaction is most noticeable for the polymers made from phenols having two alkyl substituents and least noticeable for the polymers made from phenols having two aryl substituents. The disappearance of hydroxyl groups with increase in degree of polymerization is gradual. Even with poly(2,6 - dimethyl-1,4-phenylene oxide), the decrease is only to an average of 0.9 hydroxyl group per polymer molecule at an average degree of polymerization of about 160–170, and to about 0.7 in the range of 290–300 and to about 0.4 in the range of 900–925. These values are obtained only if very pure 2,6-dimethylphenol is used. The rate of hydroxyl disappearance increases as the purity of starting phenol decreases. Other secondary reactions also occur which produce color in the polymer, i.e., chromophores or chromophore-engendering bodies (causing color to be developed later, for example, when heated) which can be due to amines and/or diphenoquinones sorbed or incorporated in the polymer molecule, carbonyl groups on the polymer molecule, etc. These reactions appear to be due to or are greatly accentuated by the type and amounts of impurities in the starting phenol.

Generally, chromophores and chromophore-engendering bodies are undesirable in the polymer unless the particular color is desired. Hydroxyl, amino and carbonyl groups generally contribute to thermal degradation of the polymer when exposed to high temperature. Therefore, it would be particularly desirable to eliminate these substituents in order to improve both the color and stability of the poly(phenylene oxides). Furthermore, it is sometimes desirable to modify the flow properties, the solubility characteristics or other properties of the polymer.

Using the purest starting phenol possible, the amount of nitrogen incorporated in the polymer is below the detectable limit of 20 p.p.m. up to an average degree of polymerization of about 140–150. However, the amount of nitrogen is about 30 p.p.m. at an average degree of polymerization of about 175–185 and about 45 p.p.m. at an average degree of polymerization of about 290–300. As mentioned above, the loss in properties associated with the decrease in hydroxyl group is not so evident in the polymers from 2-methyl-6-phenylphenol and 2,6-diphenylphenol as it is with the polymers from 2,6-dimethylphenol. However, the incorporation of amine in the polymer or copolymers is a problem with all three phenols.

It would be highly desirable to obtain poly(phenylene oxides) having the structural regularity of the head-to-tail configuration as evidence by one hydroxyl group per polymer molecule as well has having extremely low concentration of nitrogen and color-producing bodies. To attain this, the degree of polymerization should be no more than 170 and preferably even no more than about 100. Even then, it is necessary to use extremely pure starting phenol and to use the extremely active catalyst system taught by Hay, i.e., a mixture of tertiary diamine and a tertiary monoamine, otherwise, even polymers having a lower degree of polymerization will have the above discussed defects. It is evident that these types of polymers since they have such a low degree of polymerization do not have as desirable physical properties as the polymers having a higher degree of polymerization. It would be highly desirable to be able to have a polymer which had the structural regularity and other desirable properties possessed by these polymers having the lower degree of polymerization discussed above combined with the much better mechanical and physical properties of the polymers having the higher degree of polymerization.

I have discovered that this can be readily accomplished by forming an A–B–A type block copolymer where the A units are the phenoxy residue of these head-to-tail poly(phenylene oxides) joined together by the B units which are the residue of a bifunctional compound, where the functionality is due to the presence of two groups which are reactive with the phenolic hydroxyl group of the poly(phenylene oxide). This bifunctional compound may be a simple chemical compound such as a diacyl halide for example, the diacyl halides of both aliphatic and aromatic dicarboxylic acids, a bis-haloformate of a dihydric phenol or alcohol, a diisocyanate, a bis(haloaryl) sulfone, etc. The molecular weights of these compounds are so small, compared to the molecular weight of the poly(phenylene oxide), that the use of these reagents as couplers results in essentially doubling the degree of polymerization of the starting poly(phenylene oxide) when using the most ideal conditions. Generally, the exact stoichiometry needed to obtain this doubling is not possible to obtain readily and a doubling of the degree of polymerization is approached rater than obtained in a direct relationship with the accuracy of the stoichiometry.

Since increasing the chain length of the aliphatic moiety or the complexity of the ring system of the aromatic moiety of these coupling reagents would have relatively minor effect on the properties or the total molecular weight of the resulting block copolymer and are not as readily available, I prefer that the aliphatic moiety have from 1 to 8 carbon atoms and be saturated, except for the diacyl halides when it can be saturated or olefinic, and that the aromatic moiety be of the benzene series. The latter can have from one up to the total number of its hydrogen atoms replaced with $C_{1-8}$ alkyl or halogen substituents and two benzene nuclei can be joined together with a simple valence, an alkylene, alkylidene, oxygen, sulfonyl, etc. group.

In the case of the diacyl halides, bis-haloformates and bis(haloaryl)sulfones, the halogen is displaced and does not form part of the polymer. Since the chloride is very reactive and cheap, it is the halogen generally used, but the corresponding bromides, iodides or fluorides can be used if desired. The particular halide used is not critical and forms no part of this invention.

Typical examples of the simple bifunctional compounds I prefer to use as the coupling agent are the diacyl halides having the formula $$\text{X}-\overset{\overset{\text{O}}{\|}}{\text{C}}-\text{R}''-\overset{\overset{\text{O}}{\|}}{\text{C}}-\text{X}$$

the diisocyanates having the formula OCN—R'—NCO, the bis(haloformates) having the formula $$\text{X}-\overset{\overset{\text{O}}{\|}}{\text{C}}-\text{O}-\text{R}'-\text{O}-\overset{\overset{\text{O}}{\|}}{\text{C}}-\text{X}$$

and the bis(haloaryl)sulfone,

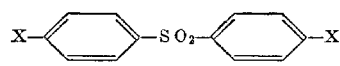

where X is halogen, e.g. fluorine, chlorine, bromine or iodine, but preferably chlorine. R' is $C_{2-8}$ alkylene, e.g., ethylene, propylene, isopropylene, the various isomeric butylenes, the various isomeric pentylenes, the various isomeric hexylenes (including cyclohexylenes) the isomeric heptylenes, the isomeric octylenes, phenylene, biphenylene, i.e.,

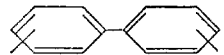

e.g., 2,2'-, 2,3'-, 2,4'-, 3,3'- 3,4'- and 4,4'-biphenylene; bis(phenylene)-$C_{1-8}$ alkane, i.e.,

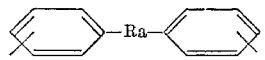

where $R_a$ is $C_{1-8}$ alkylene or alkylidene, e.g., methylene, ethylidene, isopropylidene, butylidene, etc. and the various other examples given above for R'; biphenylene oxide, i.e.,

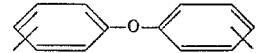

poly ($C_{2-8}$ oxyalkylene), having an average of 2 to 10 repeating units, i.e., $+R_b-O+_p$ where $p$ is 2–10 and $R_b$ is alkylene, examples of which are given above for R', and the abovementioned groups containing a phenylene or biphenylene group, e.g., the various phenylenes, biphenylenes, bis(phenylene)-$C_{1-8}$ alkanes, and (biphenylene) oxides, wherein, one up to the total number of aromatic hydrogens have been replaced with halogen, preferably chlorine, and/or $C_{1-8}$ groups. R'' is $C_{1-8}$ alkylene, $C_{1-8}$ alkenylene, phenylene, halophenylene and $C_{1-8}$ alkyl substituted phenylene.

Specific examples of the preferred diacyl halides are the acid halides of the following acids: malonic, succinic, maleic, fumaric, itaconic, mesaconic, citraconic, glutaric, adipic, pimeic, suberic, azelaic, phthalic, isophthalic terephthalic and the above phthalic acids having from one to four halogens, preferably chloro substituents or from one to four $C_{1-8}$ alkyl substituents. The preferred phthalic acid halides are unsubstituted or have from 1 to two chlorine substituents.

Specific examples of the diisocyanates are:

polymethylene diisocyanates, e.g.,
ethylene diisocyanate,
trimethylene diisocyanate,
tetramethylene diisocyanate,
hexamethylene diisocyanate,
octamethylene diisocyanate, etc.;
alkylene diisocyanates e.g.,
propylene-1,2-diisocyanate,
butylene-1,2-diisocyanate,
butylene-1,3-diisocyanate,
butylene-2,3-diisocyanate, etc.;
alkylidene diisocyanates, e.g.,
ethylidene diisocyanate,
propylidene diisocyanate,
isopropylidene diisocyanate, etc.;
cycloalkylene diisocyanates, e.g.,
cyclopentylene-1,3-diisocyanate,
cyclohexylene-1,2-diisocyanate,
cyclohexylene-1,3-diisocyanate,
cyclohexylene-1,4-diisocyanate, etc.;
aromatic diisocyanates, e.g.,
o-phenylene diisocyanate,
m-phenylene diisocyanate,
p-phenylene diisocyanate,
1-chloro-2,4-phenylene diisocyanate,
4-chloro-1,3-phenylene diisocyanate,
4,6-dichloro-1,3-phenylene diisocyanate,
2,4,6-tribromo-1,3-phenylene diisocyanate,
2,4,6-trichloro-1,3-phenylene diisocyanate,
tetrachloro-1,3-phenylene diisocyanate,
methylene-4,4'-bis(phenyl isocyanate),
2,4-tolylene diisocyanate,
2,6-tolylene diisocyanate,
3,3'-dimethyl-4,4'-biphenylene diisocyanate,
methylene-4,4'-bis(2-methylphenyl isocyanate), 2,2',5,5'-tetramethyl-4,4'-biphenylene diisocyanate,
1-chloro-2,4-phenylene diisocyanate,
4-chloro-1,3-phenylene diisocyanate,
4,6-dichloro-1,3-phenylene diisocyanate,
2,4,6-tribromo-1,3-phenylene diisocyanate,
2,4,6-trichloro-1,3-phenylene diisocyanate,
tetrachloro-1,3-phenylene diisocyanate, etc.

Bis(haloformates) of simple dihydric alcohols or dihydric phenols are extremely difficult to prepare without simultaneously producing some of the polymeric polycarbonate containing two haloformate end groups. This generally is not undesirable insofar as producing my graft copolymers is concerned. However, where it is desired to make a dicarbonate coupled graft copolymer free of any polycarbonate, it is best to proceed by first forming a haloformate of either a monohydric alcohol or a monohydric phenol and then reacting this monohaloformate with the desired dihydric alcohol or dihydric phenol to form an intermediate bis(carbonate ester). This ester can be used as the coupling agent in an ester-exchange reaction, as is well known in art, to displace the monohydric alcohol or monohydric phenol with the desired poly(phenylene oxide). Since the monohydric alcohol or the monohydric phenol will not become part of the polymer molecule, it is preferable to use a simple, low molecular weight, readily available alcohol or phenol for example methanol, ethanol, etc. or phenol, a cresol, a xylenol, etc., to first react with the carbonyl halide, preferably phosgene, since phosgene is the most readily available and the cheapest of the carbonyl halides. The chlorocarbonate ester so produced is then reacted with any of the dihydric alcohols or dihydric phenols, examples of which will be given later with reference to the various polymeric couplers for forming the block copolymers of this invention, to produce the bis-ester coupling agent.

Many bis(haloaryl) sulfones, ketones, etc. are known to react with alkali metal salts of dihydric phenols to form polymers. For my coupling reaction to form my block copolymers, I have found that the most suitable reagents of this type are the sulfones and preferably are bis(p-halophenyl)sulfones where the halo group is either flourine or chlorine.

Where still higher degrees of polymerization are desired in the final product than can be obtained with the above-described simple coupling agents, the coupling reagents used to produce the B units in the block copolymer can themselves be polymeric products obtained by reacting the simple types of compounds discussed above with dihydric alcohols or phenols to form polymers wherein the requisite group reactive with the phenolic hydroxyl group is still the terminal group on both ends of the polymer molecule.

For example, the diacyl halide may be reacted with either a dihydric alcohol or a dihydric phenol to produce a polyester. When the amount of diacyl halide exceeds the stoichiometric amount required to react with the dihydric compound, the polymer so produced will have acyl halide groups on both ends of the polymer chains. The degree of polymerization of the resulting polymer will decrease as the excess amount increases. In the same way, bis(haloformates) can be reacted to obtain polycarbonates which have two bis-(haloformate) end-groups. Likewise, diisocyanates can be reacted with dihydric compounds to produce polyurethanes which have two isocyanate end-groups and bis(halophenyl) sulfones can be reacted with alkali metal salts of dihydric phenols, including biphenols and bisphenols, to produce polysulfones which have two halophenyl end-groups.

If such reactive end-group terminated polymers have an average degree of polymerization no greater than approximately 20, these end-groups are as easily reacted with the phenolic hydroxyl groups of the poly(phenylene oxides) as the same reactive groups in the simple compounds.

When it is desired to use these polymeric coupling compounds, they are generally polymers of the simpler dihydric compounds for example, the lower alkylene glycols having from 2 to 8 carbon atoms, the dihydroxy terminated polyoxyalkylene ethers having an average number of repeating units of 2 to 10 and the alkylene group having from 2 to 8 carbon atoms or they are simple dihydric phenols, either the dihydric phenols of the benzene series, for example hydroquinone, resorcinol, etc., biphenols of the benzene series, for example dihydroxybiphenyls, etc. or bisphenols of the benzene series which are either bis(hydroxyphenyl) alkanes wherein the alkane moiety has from 1 to 8 carbon atoms or bis(hydroxyphenyl) oxides (or ethers), or the above compounds which contain either a phenylene or biphenylene group wherein from one up to the total number of hydrogens on the aryl rings are replaced by $C_{1-8}$ alkyl or halogen groups.

Specific examples of such dihydric alcohols and phenols are: the alkylene glycols, e.g. ethylene glycol, 1,2- and 1,3-propanediol, the various isomeric butanediols, the various isomeric pentanediols, the various isomeric hexanediols, including the cyclohexanediols or dihydroxycyclohexanes, the isomeric heptanediols, the isomeric octanediols, the poly(oxyalkylene) glycols, e.g., triethyleneglycol, dipropylene glycol, tetraethylene glycol, etc. Poly(oxyalkylene) glycols having a higher degree of polymerization for example, pentapropylene glycol, decaethylene glycol, etc., are usually prepared by polymerization of the appropriate alkylene oxide and are mixtures of the desired glycols whose average degree of polymerization can be obtained in the desired range.

The following are examples of phenols of the benzene series, including, biphenols, bisphenols, and the halo and alkyl substituted derivatives thereof:

hydroquinone,
resorcinol,
catechol,
1,2-dihydroxy-4-chlorobenzene,
1,4-dihydroxy-2-chlorobenzene,
1,2-dihydroxy-3,5-dichlorobenzene,
1,2-dihydroxy-4-bromobenzene,
1,3-dihydroxy-2,4,6-trichlorobenzene,
1,3-dihydroxy-2-chloro-4,6-dibromobenzene,
1,4-dihydroxy-2,3-dichlorobenzene,
1,2-dihydroxy-4-methylbenzene,
1,3-dihydroxy-4-methylbenzene,
2,5-dihydroxy-3-chlorotoluene,
tetrachlorohydroquinone,
1,4-dihydroxy-2-ethylbenzene,
1,3-dihydroxy-2,4-dimethylbenzene,
1,4-dihydroxy-2,6-dimethyl-3,5-dichlorobenzene,
1,4-dihydroxy-2-methyl-5-n-propylbenzene,
1,4-dihydroxy-3-isopropyl-5-chloro-6-methylbenzene, etc.,
2,2'-dihydroxydiphenyl,
2,4'-dihydroxydiphenyl,
4,4'-dihydroxydiphenyl,
4,4'-dihydroxy-3,3'-diethyldiphenyl,
3-chloro-4,4'-dihydroxydiphenyl,
3,3',5,5'-tetrachloro-4,4'-dihydroxydiphenyl,
3,3',5,5'-tetrabromo-4,4'-dihydroxydiphenyl,
4,4'-dihydroxydiphenyl ether,
the 3,4'-, 2,4'-, 3,3'-, 2,2'-, 2,3'-, etc. dihydroxydiphenyl ethers,
4,4'-dihydroxy-2,6-dimethyldiphenyl ether,
4,4'-dihydroxy-2,5-dimethyldiphenyl ether,
4,4'-dihydroxy-3,3'-di-isobutyldiphenyl ether,
4,4'-dihydroxy-3,3'-diisopropyldiphenyl ether,
4,4'-dihydroxy-3,3'-dichlorodiphenyl ether,
4,4'-dihydroxy-3,3'-difluorodiphenyl ether,
4,4'-dihydroxy-2,3'-dibromodiphenyl ether,
2,4'-dihydroxytetraphenyl ether,
4,4'-dihydroxytriphenyl ether,
2,4'-dihydroxydiphenylmethane,
bis(2-hydroxyphenyl)methane,
bis(4-hydroxyphenyl)methane, bis(3,5-dichloro-4-hydroxyphenyl)methane,
bis(4-hydroxy-2,6-dimethylphenyl)methane,
bis(2-hydroxy-4,6-dimethylphenyl)methane,
1,1-bis(4-hydroxyphenyl)ethane,
1,2-bis(4-hydroxyphenyl)ethane,
2,2-bis(4-hydroxyphenyl)propane,
1,1-bis(4-hydroxyphenyl)heptane,
4,4-bis(4-hydroxyphenyl)heptane, etc.

From what has been said above, it is evident that the block copolymers of this invention can best be described as having the formula

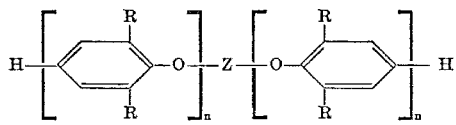

where each R is independently selected from the group consisting of methyl and phenyl and $n$ is the average number of repeating units and is in the range of 40 to 170, and Z is a divalent segmer having one of the formulae

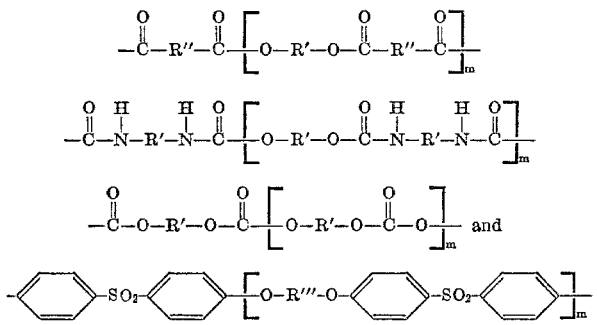

where, in each of the above formulae, R' is $C_{2-8}$ alkylene, phenylene, biphenylene, bis(phenylene)-$C_{1-8}$ alkane, bis(phenylene) oxide, poly($C_{2-8}$-oxyalkylene) having an average number of repeating units of from 2 to 10 and the aforementioned groups containing a phenylene or biphenylene group wherein from 1 up to the total number of hydrogens on the aryl rings are replaced by $C_{1-8}$ alkyl or halogen, each R'' is $C_{1-8}$ alkylene, $C_{1-8}$ alkenylene, phenylene, halophenylene and $C_{1-8}$ alkyl substituted phenylene, R''' is phenylene, biphenylene, bis(phenylene)-$C_{1-8}$ alkane, bis(phenylene) oxide and the $C_{1-8}$ alkyl and halogen ring-substituted derivatives thereof and $m$ represents the number of repeating units and is in the range of from 0 to 20. It is evident that when $m$ is 0 that the simple difunctional compounds discussed above have been used as the coupling reagent and when $m$ is 1 to 20 that the polymeric compounds having an average degree of polymerization of $m+1$ have been used as the coupling agent.

The reaction between the poly(phenylene oxide) and the difunctional compound can be effected in a wide variety of ways, dependent on the desires of the operator. Although not essential, it is preferable to carry out the reaction in a solvent in which both the reactants and the block copolymer product are soluble. In those reactions where a hydrogen halide is produced by the reaction of the hydroxyl group of the poly(phenylene oxide) and the halide of the bifunctional compound, the reaction is promoted by providing means for escape of the hydrogen halide so produced or by the use of a hydrogen halide acceptor in the reaction mixture. Such a hydrohalide acceptor may be an alkali metal hydroxide, an alkaline earth metal hydroxide or oxide or a tertiary amine.

If desired, an alkali metal salt of the poly(phenylene oxide) can be made, using an alkali metal adduct of a diaryl ketone, by the method disclosed and claimed in Hay, U.S. Pat. 3,402,143. Alternatively, the alkali metal adduct of triphenyl methane can be used as described by House and Kramer in J. Org. Chem, 27, 4147 (1962). In these reactions, the adduct which is highly colored, is used to titrate the solution of the poly(phenylene oxide) until the deep color of the adduct persists. Knowing the titer of the alkali metal adduct, the stoichiometric proportions of the poly(phenylene oxide) and the difunctional coupling agent are readily determined. In the reaction of the bis(haloaryl)sulfones, the use of the alkali metal salt of the poly(phenylene oxide) is required to effect the reaction.

In the case of the diisocyanates, the poly(phenylene oxide) preferably is in the form of the hydroxy-terminated polymer, since the reaction with the isocyanate group involves the hydrogen of the hydroxyl group. However, the salt form of the polymer can be used if desired, since work up procedures result in the removal of the cation of the salt. This reaction is catalyzed by the use of a tertiary amine, for example trimethylamine, triethylamine, pyridine, etc. The reactions are generally carried out at room temperature although heating will speed the reaction. Temperatures up to the reflux temperature of the reaction mixture at the ambient pressure can be used. Generally, there is no advantage to using superatmospheric pressure, although it can be used if desired to obtain a higher reflux temperature provided, in those reactions where a hydrogen halide is found, the venting of this gas does not present any problem.

The general conditions required for the reaction of the hydroxyl group, or its alkali metal salt, of the poly(phenylene oxide) and the reactive group of the difunctional compound involves reaction conditions which are well known to those skilled in the art giving due consideration to the particular reaction involved in making a particular block copolymer. For example, where the reaction involves the making of an ester between an acyl halide of the difunctional compound and the hydroxyl of the poly(phenylene oxide), esterification conditions for such reactive groups will be effective. Likewise, when the reaction involves the diisocyanate group of the difunctional compound and the hydroxyl group of the poly(phenylene oxide), reaction conditions applicable to the production of polyurethanes from diisocyanates and anionic forms of dihydroxy compounds will be effective in producing the desired block copolymer. The particular reaction conditions used are not critical to the preparation of my block copolymers, and form no part of this invention.

In order that those skilled in the art may readily understand my invention, the following examples are given by way of illustration and not by way of limitation. In all of the examples, parts and percentages are by weight, temperatures are given in degrees centigrade and intrinsic viscosities are determined in chloroform at 25° C., unless stated otherwise.

In general the poly(phenylene oxides) in the following examples were prepared by the methods disclosed in the above-referenced Hay U.S. patents. The particular times and temperatures to obtain a particular viscosity can vary somewhat depending upon the purity of the reagents. If under a particular set of reaction conditions, particular batches of reagents lead to a higher intrinsic viscosity than desired, a shorter reaction time will correct this. Conversely, a longer reaction time will give a higher intrinsic viscosity. As mentioned above, poly(2,6-dimethyl-1,4-phenylene oxide) is more subject to disappearance of the hydroxyl group for a particular molecular weight or degree of polymerization than are the other two poly(phenylene oxides) of this invention. Example 1, therefore, is given to illustrate the preparation of this polymer from 2,6-dimethylphenol.

EXAMPLE 1

A commercially available 2,6-dimethylphenol having a purity of 99+% was still further purified to a purity of 99.9% by fractional distillation and two fractional recrystallizations. Three reactions were run, each for a different length of time. In each case, oxygen was bubbled through a stirred mixture of 1.0 g. of cuprous chloride, 1.5 ml. of N,N,N',N'-tetramethylethylenediamine, 4.72 g. of trimethylamine which had previously been dissolved in 45 ml. of toluene, 50 g. of anhydrous magnesium sulfate and 1230 ml. of benzene at 25°. After the cuprous chloride was dissolved, 100 g. of the highly purified 2,6-dimethylphenol was added. The reaction mixture was cooled with a water bath at room temperature so that the maximum reaction temperature did not exceed 35°. After the desired time, the reaction was stopped by the addition of 25 ml. of concentrated aqueous hydrochloric acid. After removal of the magnesium sulfate, the reaction mixture was poured into an excess of methanol to precipitate the polymer which was well washed with water. The results are shown in Table I.

TABLE I

| Reaction time minutes | Intrinsic viscosity, dl./g. | Hydroxyls/ polymer molecule | Nitrogen, p.p.m. |
|---|---|---|---|
| 19.5 | 0.32 | 1.0 | 20 |
| 23 | 0.48 | .9 | 20 |
| 27 | 0.55 | .9 | 30 |

EXAMPLE 2

A solution of 3.0 g. of a poly(2,6-dimethyl-1,4-phenylene oxide) having an intrinsic viscosity of 0.27 in 60 ml. of toluene was placed under nitrogen and heated to distill approximately 30 ml. of the toluene in order to insure that all water was removed. After cooling to room temperature, the solution was titrated under a nitrogen atmosphere with a sodium benzophenone complex prepared by dissolving 2.3 g. of sodium, 8.4 g. of benzophenone and 6.0 g. of trimethylamine in 50 ml. of benzene and shaking until all of the sodium metal dissolved. This dissolution was also carried out under nitrogen. When the purple color of the complex persisted, addition of the complex was stopped. To this solution, 0.024 g. of bis(p-chlorophenyl)sulfone and 30 ml. of dimethylsulfoxide were added and heated to reflux. Toluene was allowed to distill from the solution until the reflux temperature reached 161°, at which temperature refluxing was continued for ½ hour and the solution cooled. The resulting graft copolymer was precipitated from solution by pouring the reaction into 600 ml. of methanol. The precipitated polymer was redissolved in 100 ml. of chloroform and again precipitated by slow addition of 400 ml. of methanol to the stirred solution. The isolated polymer had an intrinsic viscosity of 0.35. The initial polymer had an average molecular weight of approximately 9000 which was increased to greater than 13,000 by this coupling reaction. The initial polymer was too low in molecular weight to prepare a film, whereas the polymer after coupling would produce a coherent relatively flexible film.

In the following examples, where a halide was used as the coupling reagent, the general method was to dissolve the poly(phenylene oxide) in the stated amount of solvent, after which the stated amount of the solvent was removed by distillation to remove traces of water and any low boiling materials. After cooling to room temperature, the hydrogen halide acceptor and the coupling agent were added and the solution refluxed approximately 18 hours, after which the coupled polymer was precipitated in the appropriate amount of methanol and isolated by the general procedure described in Example 2.

Where the potassium salt of the polymer was used, it was made by titrating the anhydrous polymer solution with a one molar solution of triphenylmethyl potassium in 1,2-dimethoxyethane, prepared by the method disclosed by House and Kramer in Journal of Organic Chemistry 27, 4147 (1962), until the deep red color of the titrant persisted. The coupling agent was then added and the reaction run at room temperature for approximately 18 hours followed by the usual isolation of the polymer. In all cases, the yields of the coupled polymer varied between 95 percent and 100 percent of theoretical.

EXAMPLE 3

Using the general procedure, 2.7 g. of poly(2,6-dimethyl-1,4-phenylene oxide) was dissolved in 20 ml. of benzene from which 10 ml. benzene was distilled. After cooling to room temperature, 2 drops of triethylamine were added and 0.023 g. of methylene-4,4'-bis(phenylisocyanate) was added. The intrinsic viscosity of the starting polymer was 0.33 and that of the block copolymer product was 0.44 corresponding to an average molecular weight increase of from 11,000 to 16,000.

When this example was repeated, but using 0.0194 g. of 2,4-toluenediisocyanate, an identical increase in molecular weight was obtained. When this example was repeated but using 0.015 g. of succinyl chloride in place of the diisocyanate and 0.5 ml. of pyridine as a hydrogen halide acceptor in place of the amine catalyst, similar results were obtained as was also the case when the potassium salt of the poly(2,6-dimethyl-1,4-phenylene oxide) was used with these three coupling reagents.

EXAMPLE 4

This example illustrates the use of a high boiling solvent which permits expulsion of the hydrogen halide from the reaction vessel thereby eliminating the use of a hydrogen halide acceptor. A solution of 2.7 g. of poly(2,6-dimethyl-1,4-phenylene oxide) in 25 ml. of diphenyl ether was heated to distill 10 ml. of the diphenyl ether. After cooling, 0.0193 g. of isophthaloyl chloride was added and the reaction refluxed as described in the general procedure. The intrinsic viscosity was increased from 0.33 for the starting polymer to 0.41 for the block copolymer corresponding to a molecular weight increase of from 11,000 to 15,000.

The same block copolymer was also prepared by first converting 4.11 g. of the polymer in 40 ml. of benzene to the potassium salt which was then reacted with 0.050 g. of isophthaloyl chloride by the method described in the general procedure. In this case, the starting polymer has an average molecular weight of 10,000 which was increased to 15,000 in the block copolymer product.

EXAMPLE 5

This example illustrates the use of a diacyl halide terminated polymer as the coupling agent. The coupling agent was made by reacting a solution of 5.08 g. of terephthaloyl chloride with 5.92 g. of 2,2-bis(4-hydroxyphenyl)propane in 55 ml. of diphenyl ether at reflux for 90 minutes to give a diacyl halide terminated polyester having an average of 9.6 repeating units. This was reacted with 37.2 g. of poly-(2,6-dimethyl-1,4-phenylene oxide) in 155 ml. of diphenyl ether by the general procedure described above. The initial poly(phenylene oxide) had an intrinsic viscosity of 0.23 and the resulting block copolymer had an intrinsic viscosity of 0.39, corresponding to an increase in molecular weight of 7000 for the starting poly(phenylene oxide) to 14,000 for the resulting block copolymer.

Similar results were obtained by using the potassium salt of poly(2,6-dimethyl-1,4-phenylene oxide) and a bis-(haloformate) terminated polycarbonate to form the block copolymer. In this case, the polycarbonate had an average of about 20 repeating units. This polycarbonate was prepared by first passing phosgene into a solution of 40 ml. of pyridine in 125 ml. of methylene chloride under nitrogen until a solid complex precipitated. A solution of 20 g. of 2,2-bis(4-hydroxyphenyl)propane in 15 ml. of pyridine and 30 ml. of methylene chloride was added to this reaction mixture while additional phosgene was added. A total of 20 g. of phosgene was used for this reaction. The reaction was allowed to stand overnight at 25°, after which nitrogen was bubbled through to remove any excess phosgene. A sample of this chloroformate-terminated polycarbonae polymer had an intrinsic viscosity of 0.12 corresponding to an average degree of polymerization of about 20.

EXAMPLE 6

A solution of 4.0 g. of poly(2-methyl-6-phenyl-1,4-phenylene oxide) in 50 ml. of benzene was distilled to remove 10 ml. of benzene. After cooling, the polymer was converted to its potassium salt and reacted with 0.0234 g. of isophthaloyl chloride at room temperature as described in the general procedure. In a similar manner, 6.00 g. of poly(2,6-diphenyl-1,4-phenylene oxide) in 75 ml. of benzene which was distilled to remove 15 ml. of benzene was first converted to the potassium salt and reacted at room temperature with 0.0165 g. of isophthaloyl chloride. The initial polymers had intrinsic viscosities of 0.18 and 0.23, respectively, and the resulting block copolymers had intrinsic viscosities of 0.27 and 0.30, respectively, corresponding to molecular weight increases of 15,000 to 24,000 in the first polymer and from 37,000 to 54,000 in the second polymer.

As will be recognized by those skilled in the art, the actual determination of molecular weights and degree of polymerization is not extremely accurate, yet to obtain the highest molecular weights in the block copolymers requires precise stoichiometry. Although this might account for some of the above results not showing complete doubling of molecular weight, this is not the complete story since, of course, the coupling agent used has a profound effect on the solubility characteristics and therefore the osmotic methods used for determining molecular weights can be effected. This was illustrated in one case where gel permeation was used to check the change in molecular weight for the polymer and block copolymer from poly(2 - methyl - 6 - phenyl - 1,4 - phenylene oxide). Osmotic molecular weight measurements showed a change in molecular weight of 15,000 for the starting polymer to 24,000 in the block copolymer. Gel permeation results showed a change in molecular weight of 14,000 for the starting polymer to 29,000 in the block copolymer.

It is apparent from the above examples that a convenient way of increasing molecular weight to improve the physical properties of the polymers while maintaining the desirable characteristics of the low molecular weight polymer has been accomplished. As further illustration of this, a sample of one of the block copolymers having an intrinsic viscosity of 0.46 was molded under heat and pressure and found to undergo no change in intrinsic viscosity. A similar uncoupled poly(phenylene oxide) having an intrinsic viscosity of the same order would have increased during molding by 125 percent, showing the increased stability under heat of the block copolymers of this invention.

Although the above examples have illustrated many variations, other obvious variations may be made within the scope of this invention without departing from the scope as defined in the appended claims. For example, when a volatile coupling agent is used, e.g., phosgene, a diacyl halide, etc., the solution of the poly(phenylene oxide) can be divided into two equal volumes. One volume of this polymer can be reacted with an excess of the coupling agent to insure complete reaction of all of the hydroxyl groups of the poly(phenylene oxide). The excess coupling agent is then removed and the other volume of polymer added thereafter. Precaution, of course, must be taken to guard aaginst hydrolysis or side reactions of the intermediate reaction product prior to reacting with the second portion of the poly(phenylene oxide).

Prior to molding or use, the polymers of this invention may be mixed with fillers, dyes, lubricants, and the usual compounding agents used with molding powders. The polymer may also be blended with other polymers compatible therewith, for example, polystyrene, polystyrene containing rubbers known as high-impact polyprene, etc. These and other variations will be readily discernible to those skilled in the art and are within the full intended scope of the invention as defined by the appended claims.

What I claim as new and desired to secure by Letters Patent of the United States is:

1. A block copolymer having the formula

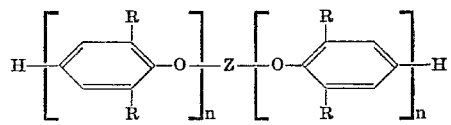

where each R is independently selected from the group consisting of methyl and phenyl and $n$ is the average number of repeating units and is in the range of 40 to 170, and Z is a divalent segmer having the formula

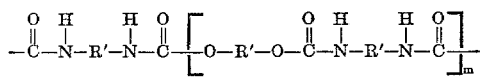

where R' is $C_{2-8}$ alkylene, phenylene, biphenylene, bis(phenylene)-$C_{1-8}$ alkane, bis(phenylene) oxide, poly($C_{2-8}$-oxyalkylene) having an average number of repeating units of from 2 to 10 or the aforementioned groups containing a phenylene or biphenylene group wherein from 1 up to the total number of hydrogens on the aryl rings are replaced by $C_{1-8}$ alkyl or halogen and $m$ represents the number of repeating units and is in the range of from 0 to 20.

2. The block copolymer of claim 1 which is a bis[poly(2,6-dimethyl-1,4-phenylene oxide)]urethane.

3. The block copolymer of claim 1 wherein the urethane moiety is a polymeric urethane of a diisocyanate and a dihydroxy compound.

4. The block copolymer of claim 3 wherein the dihydroxy compound is a phenol having each of its two phenolic hydroxyl groups on separate benzene rings.

5. The block copolymer of claim 4, wherein the phenol is a bis(hydroxyphenyl)alkane.

6. The block copolymer of claim 1 wherein the urethane moiety is the residue of a diisocyanate having each of its two isocyanate groups directly attached to a benzene ring.

7. The block copolymer of claim 6, wherein the two isocyanate groups of the diisocyanate precursor of the urethane moiety are attached to the same benzene ring.

8. The block copolymer of claim 6, wherein the two isocyanate groups of the diisocyanate precursor of the urethane moiety are attached to the different benzene rings.

References Cited
UNITED STATES PATENTS

| | | | |
|---|---|---|---|
| 3,431,238 | 3/1969 | Borman | 260—858 |
| 3,364,157 | 1/1968 | Halek | 260—858 |
| 3,549,670 | 12/1970 | Spousta | 260—858 |

PAUL LIEBERMAN, Primary Examiner

U.S. Cl. X.R.

260—47 C, 49, 77.5 AP, 823, 860